Oct. 15, 1957     H. E. TEMPLE     2,809,739
CONVEYOR STRIPPING APPARATUS

Original Filed Feb. 23, 1951     4 Sheets—Sheet 1

INVENTOR.
HIRAM E. TEMPLE
BY HIS ATTORNEY

Oct. 15, 1957     H. E. TEMPLE     2,809,739
CONVEYOR STRIPPING APPARATUS
Original Filed Feb. 23, 1951     4 Sheets-Sheet 2
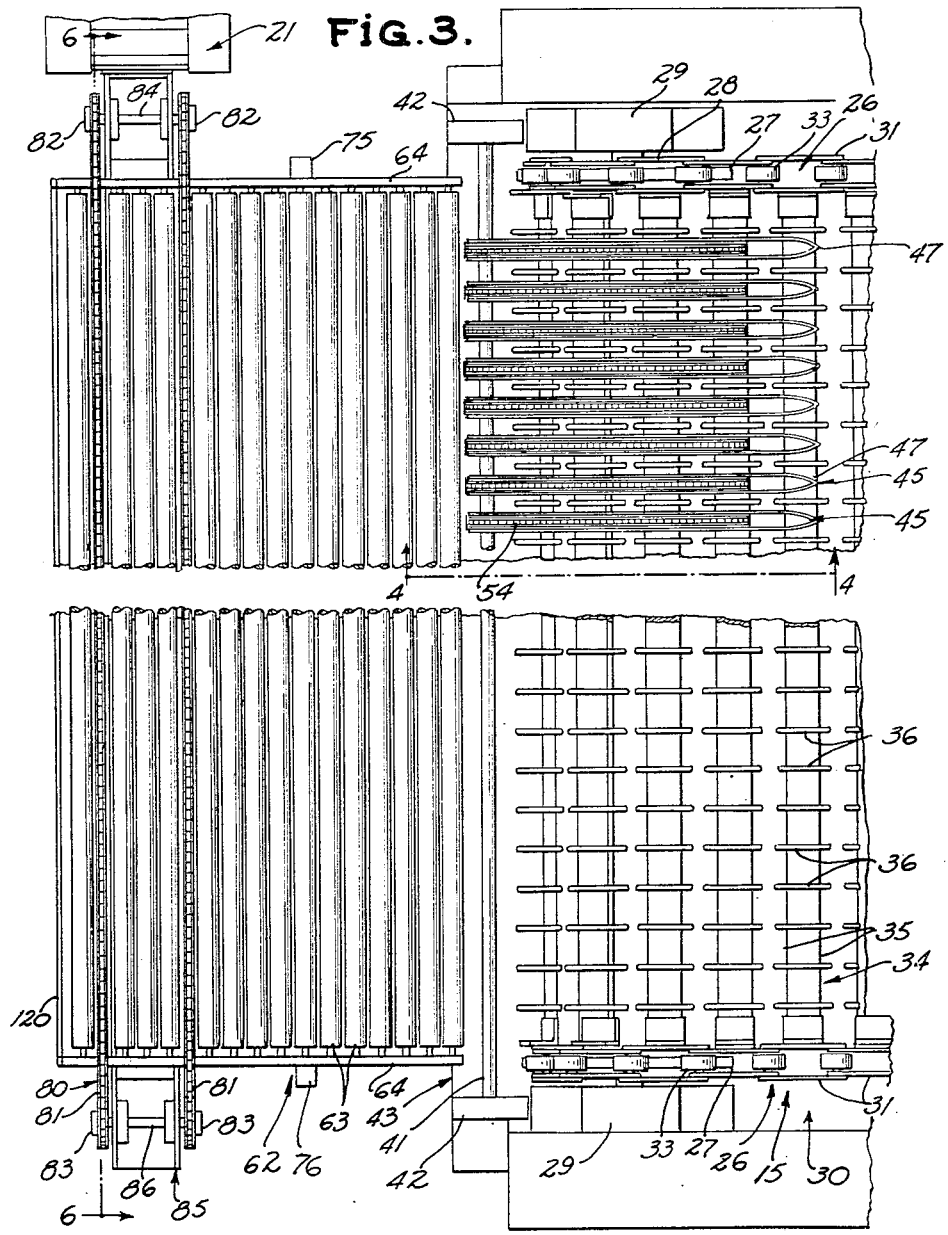
INVENTOR.
HIRAM E. TEMPLE
BY HIS ATTORNEY
Otto Moeller

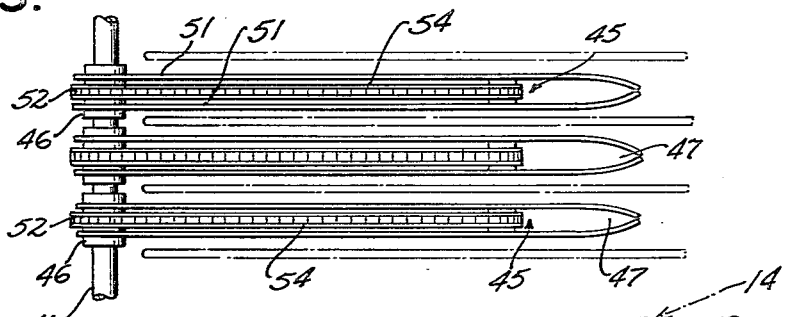
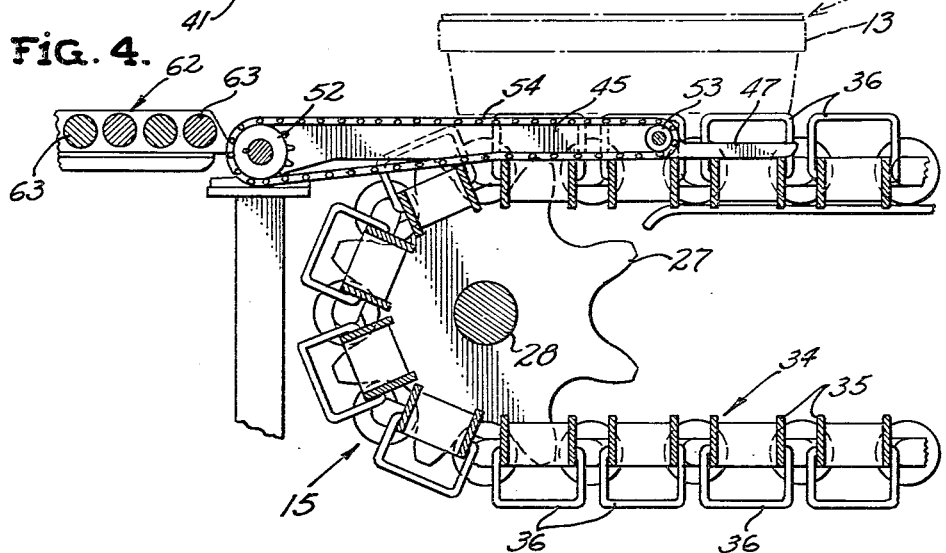
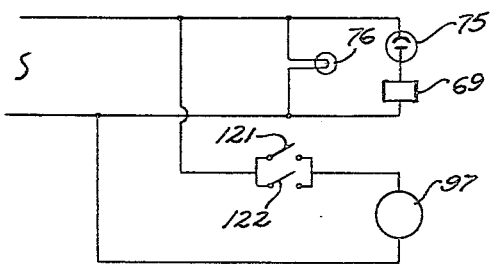

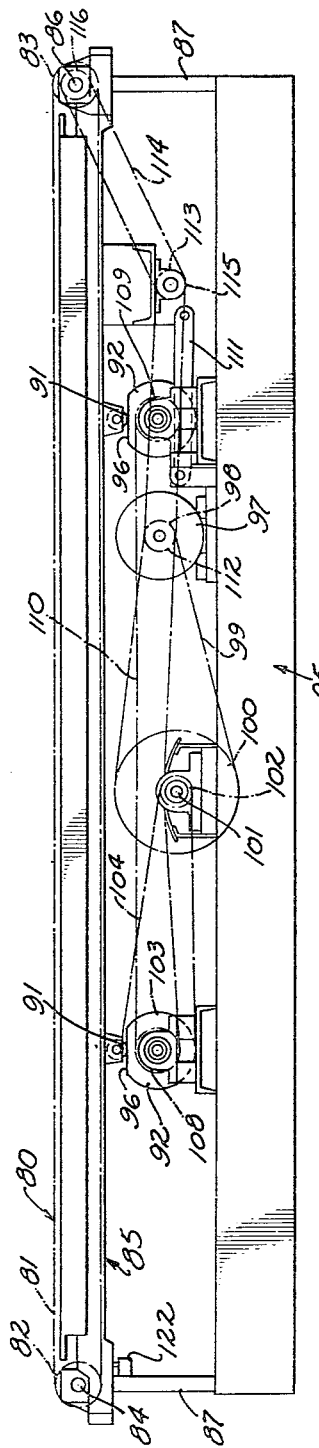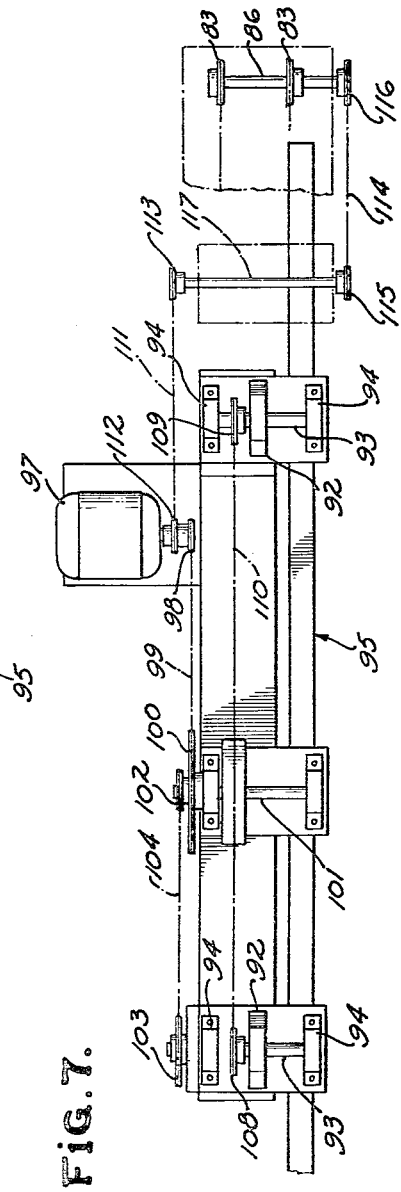

United States Patent Office 2,809,739
Patented Oct. 15, 1957

2,809,739

CONVEYOR STRIPPING APPARATUS

Hiram E. Temple, San Gabriel, Calif., assignor, by mesne assignments, to Capitol Products Corporation, Mechanicsburg, Pa., a corporation of Pennsylvania Original application February 23, 1951, Serial No. 212,426, now Patent No. 2,673,640, dated March 30, 1954. Divided and this application November 23, 1953, Serial No. 393,740

3 Claims. (Cl. 198—21)

The present invention relates to an apparatus for stripping articles from a conveyor and a primary object of the invention is to provide an improved apparatus of this character, this application being a division of my copending application Serial No. 212,426, filed February 23, 1951, and now Patent No. 2,673,640.

As a matter of convenience, the present invention will be considered in connection with the baking industry since it finds particular utility therein for stripping such articles as straps of pans containing bakery goods from conveyors on which the pan straps are transported. For example, the present invention may be embodied in an apparatus for stripping straps of pans containing raised dough from the discharge end of a conveyor which extends through a proofer for raising the dough. However, it will be understood that the present invention may be embodied in an apparatus for stripping pan straps from other conveyors in a bakery, or for stripping articles other than pan straps from a conveyor.

In general, an object of the invention is to provide a conveyor stripping apparatus which includes a longitudinal conveyor having a lateral conveyor associated therewith, the lateral conveyor being adapted to strip articles from the longitudinal conveyor.

Another object is to provide a lateral conveyor which is movable upwardly from a retracted position wherein it is inoperative to strip articles from the longitudinal conveyor to an extended position wherein it is operative to do so. Another object in this connection is to provide means for increasing the speed of the longitudinal conveyor so as to space an article thereon from a following article on said conveying devices.

Still another important object of the invention is to provide such a conveyor stripping apparatus which handles the articles stripped thereby gently and subjects them to a minimum of jarring, which is an important feature, particularly when the apparatus is employed for stripping straps of pans containing raised dough.

The foregoing objects and advantages of the present invention, together with various other objects and advantages thereof which will become apparent, may be attained with the exemplary embodiment of the invention illustrated in the accompanying drawings and described in detail hereinafter.

Referring to the drawings:

Fig. 3 is a plan view taken as indicated by the arrowed line 3—3 of Fig. 2;

Fig. 4 is a further enlarged, fragmentary sectional view taken as indicated by the broken line 4—4 of Fig. 3;

Fig. 5 is a fragmentary plan view of the structure shown in Fig. 4;

Fig. 6 is a sectional view taken along the broken line 6—6 of Fig. 3;

Fig. 7 is a fragmentary plan view, with parts broken away, of the structure shown in Fig. 6; and, Fig. 8 is a schematic diagram of an electrical circuit of the apparatus of the invention.

Figure 1:
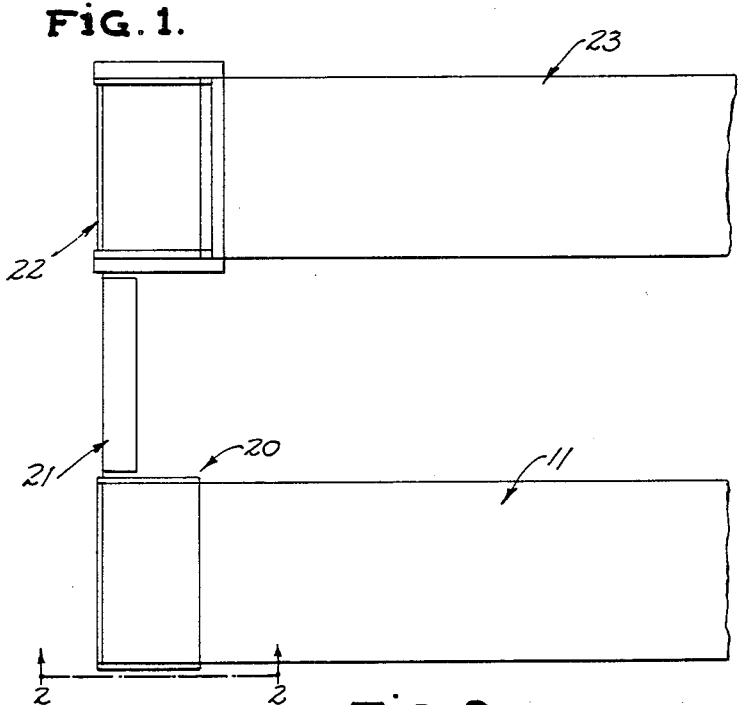
Fig. 1 is a diagrammatic plan view illustrating an installation embodying the present invention.

Referring particularly to Fig. 1 of the drawings, diagrammatically illustrated therein is a baking installation which includes a steam proofer 11 for raising bread or other goods to be baked. The bread dough to be raised in the steam proofer 11 is placed in baking pans 12, Fig. 2, et seq., which are arranged side by side in spaced relation and secured together by an encircling strap 13 to form a pan unit or pan strap 14. The pan straps 14 containing the loaves of bread to be raised are transported through the steam proofer 11 by a conveyor 15, Fig. 2. In large baking installations in particular the width of the proofer conveyor 15 is such that several pan straps may be arranged side by side transversely thereof to form a pan strap rank, the pan strap ranks being spaced apart longitudinally of the conveyor 15.

Continuing to refer particularly to Fig. 1, the baking installation illustrated therein includes an apparatus 20 of the invention adjacent the discharge or outlet end of the proofer conveyor 15 for stripping the pan straps therefrom, the loaves of bread in the pans having been raised by the time the pan straps arrive at the discharge end of the conveyor 15. The conveyor stripping apparatus 20 delivers the pan straps in single file to a cross-conveyor 21, which, in turn, delivers the pan straps in single file to an oven loading apparatus 22. The latter loads the single file of pan straps delivered thereto into a traveling oven 23, preferably in the form of pan strap ranks. The ranks of pan straps are conveyed through the oven 23 in any suitable manner, not shown, the loaves of bread in the individual pans being baked by the time the pan straps arrive at the discharge or outlet end of the oven.

Considering the proofer conveyor 15 in more detail, it includes a pair of endless chains 26 each of which is trained over a sprocket 27 at the discharge end of the proofer 11 and over a similar sprocket, not shown, at the inlet end thereof. The two sprockets 27 are fixed on a shaft 28 which is rotatable in bearings 29 carried by a frame 30 of the proofer. The conveyor 15 may be driven in any suitable manner, not shown. Each of the chains 26 includes a plurality of links 31 interconnected by pins which carry rollers 33, the latter being engageable with the teeth of the sprockets 27. As best shown in Figs. 3 and 4, extending between and carried by opposite links on the two chains 26 are transverse beams 34 each shown as including two parallel, spaced plates 35 arranged at right angles to the two links to which they are connected. Each of the beams 34 carries a plurality of U-shaped supporting elements 36 which are spaced apart transversely of the conveyor 15 to form a rank of supporting elements. The corresponding elements 36 of the different ranks thereof are aligned longitudinally of the conveyor 15 to provide rows or files of such elements longitudinally of the conveyor. The pan straps being transported through the proofer 11 by the conveyor 15 rest on the supporting elements 36 and are spaced upwardly from the conveyor 15 thereby, i. e., are spaced upwardly from the beams 34 thereby.

Considering the apparatus 20 for stripping the pan straps from the proofer conveyor 15, and referring particularly to Figs. 2 to 5 of the drawings, the apparatus 20 includes a shaft 41 which extends transversely of the conveyor 15 adjacent the discharge end thereof and which, in the particular construction illustrated, is on the same general level as the upper run of the conveyor 15, although the level of the shaft 41 relative to the level of the upper run of the conveyor 15 may differ from that shown. The shaft 41 is rotatable in bearings 42 carried by a frame 43 of the apparatus 20. Pivotally or rotatably mounted on the shaft 41 are fingers 45 which are spaced apart transversely of the shaft and which extend longitudinally of the proofer conveyor 15, the fingers 45 preferably being provided with hubs 46, Fig. 5, at their pivoted ends to provide bearings for engagement with the shaft 41. The fingers 45 are aligned with the spaces between the files of supporting elements 36 and are insertable under pan straps carried by such supporting elements, the free ends of the fingers resting on the conveyor 15, i. e., resting on the transverse beams 34 of the conveyor 15. As best shown in Figs. 3 and 4, the fingers 45 are provided with shoes 47 at their free ends for engagement with the conveyor 15.

It is important to note that the fingers 45 are pivotally mounted on the shaft 41 independently of each other so that the free ends thereof may rise and fall independently of each other to compensate independently for any irregularities on the conveyor 15. Thus, the transverse contour of the fingers 45 always conforms to the transverse contour of the proofer conveyor 15 so that all of the fingers are spaced below the bottoms of the pans of the pan straps carried by the conveyor 15 the same distance, which is an important feature.

As best shown in Fig. 5, each finger 45 is bifurcated from its pivoted end to a point adjacent its free end to provide spaced arms 51. Disposed between the arms 51 of each finger 45 and keyed or otherwise fixed on the shaft 41 is a driving sprocket 52. Also disposed between the arms 51 of each finger 45 and carried by such finger is a driven sprocket 53, the driven sprockets 53 being located adjacent the free ends of the fingers. An endless chain 54 is trained around the driving and driven sprockets 52 and 53 associated with each finger 45, the chains 54 serving as conveying devices which strip the pan straps from the conveyor 15 and which transport such pan straps longitudinally away from the conveyor 15, i. e., which transport the pan straps away from the conveyor 15 in the direction of movement thereof.

Preferably, the upper surfaces of the upper runs of the chains 54 are only slightly below the upper surfaces of the supporting elements 36 to minimize jarring of the pan straps as they are stripped from the conveyor 15 by the chains 54. As will be apparent, independently pivoting the fingers 45 on the shaft 41 in the manner hereinbefore described insures that the distances between the upper surfaces of the upper runs of the chains 54 and the upper surfaces of the supporting elements 36 are substantially uniform all the way across the conveyor 15 so as to insure uniform handling of all of the pan straps, which is an important feature. Preferably, the fingers 45 are of sufficient length so that the shoes 47 engage the conveyor 15 at points beyond the shaft 28 of such conveyor so that the upper surfaces of the upper runs of the chains 54 may be maintained substantially parallel to the upper surfaces of the supporting elements 36 for substantial distances. However, the fingers 45 may be lengthened or shortened if desired.

Thus, with the foregoing construction, the pan straps are transferred from the conveyor 15 to the conveying devices 54 smoothly and without dropping the pan straps onto the conveying devices, even though the conveyor 15 may sag transversely between the sprockets 27 supporting the chains 26 thereof, or may have other irregularities.

As will be apparent, in order to drive the chains 54, it is merely necessary to drive the shaft 41. This may be accomplished in any suitable manner as long as the linear speed of the chains 54 is at least as high as the linear speed of the conveyor 15 to avoid a pile up of pan straps on the chains 54. In order to synchronize the chains 54 with the conveyor 15, the shaft 41 may be driven directly from the conveyor 15, as by a chain 57 trained around a sprocket 58 on the conveyor shaft 28 and a sprocket 59 on the shaft 41.

The chains 54 discharge the pan straps onto a longitudinal conveyor 62 which is carried by the frame 43 adjacent the outlet end of and in alignment with the conveyor system formed by the chains 54. The longitudinal conveyor 62, in the particular construction illustrated, includes a plurality of rollers 63 having driving connections therebetween so that all of the rollers rotate at the same speed. For example, the rollers 63 may be geared together by means of gear trains, not shown, disposed in gear train housings 64 at the ends of the rollers. The rollers 63 may thus be driven by means of a sprocket 65, for example, connected to one of the rollers.

Figure 2:
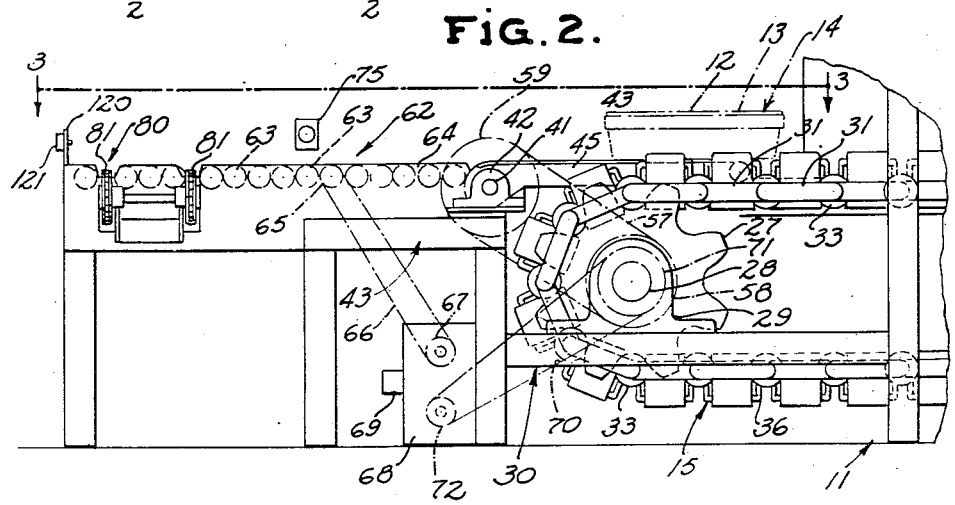
Fig. 2 is an enlarged side elevation of an apparatus embodying the invention and taken as indicated by the arrowed line 2—2 of Fig. 1.

For reasons which will become apparent, it is desirable to space each rank of pan straps delivered to the longitudinal conveyor 62 from the following rank in the direction of movement of the conveyor 62. This may be accomplished by operating the conveyor 62 at a low speed, preferably at least equal to the speed of the chains 54, until such time as a rank of pan straps is completely on the conveyor 62, and then operating the conveyor 62 at a higher speed sufficient to space such rank of pan straps from the following rank. The speed of the conveyor 62 may be varied from low to high in various ways. For example, the sprocket 65 for driving the conveyor 62 may be connected by means of a chain 66 to a sprocket 67 on a two-speed transmission 68 which is operated by a solenoid 69. The power input to the transmission 68 may be from the proofer conveyor 15 by way of a chain 70 trained around a sprocket 71 on the conveyor shaft 28 and a sprocket 72 on the transmission 68. This arrangement has the advantage of synchronizing the low speed of the conveyor 62 with the conveyor 15 and with the chains 54. The solenoid 69 for operating the transmission 68 to increase the speed of the conveyor 62 from low to high may be controlled by a photocell 75 which is disposed on one side of the longitudinal conveyor 62 intermediate the ends thereof and which is adapted to receive light from a light source 76 disposed on the opposite side of the conveyor 62, as best shown in Figs. 2 and 3. Thus, when a rank of pan straps delivered to the conveyor 62 intercepts the light beam to the photocell 75, the photocell energizes the solenoid 69, which, in turn, operates the transmission 68 to increase the speed of the longitudinal conveyor 62 from low to high so as to space the rank of pan straps from the following rank. The various electrical elements and the connections therebetween are shown diagrammatically on the circuit of Fig. 8.

After each rank of pan straps has been spaced from the following rank by the longitudinal conveyor 62 in the foregoing manner, it is transferred onto the cross-conveyor 21 in the form of a file of pan straps by a lateral conveyor 80, which extends transversely of the longitudinal conveyor 62 and which is aligned with the cross-conveyor 21. The lateral conveyor 80 is shown as comprising a pair of endless chains 81 each of which is disposed between a pair of the rollers 63 of the longitudinal conveyor 62, the rollers between which the chains 81 are disposed being spaced apart sufficiently to accommodate the chains.

In order to permit the longitudinal conveyor 62 to transport each rank of pan straps into a position above the lateral conveyor 80 before such rank is transported onto the cross-conveyor 21 by the lateral conveyor, the lateral conveyor is mounted for movement between a retracted position and an extended position. When the lateral conveyor 80 is in its retracted position, the chains 81 thereof are below the upper surface of the longitudinal conveyor 62, as shown in Fig. 2. In moving from its retracted position to its extended position, the lateral conveyor 89 moves upwardly until the chains 81 are above the upper surface of the longitudinal conveyor 62. Referring particularly to Fig. 6 of the drawings, the chains 81 are trained around sprockets 82 at one end of the lateral conveyor 80 and are trained around sprockets 83 at the other end thereof, the sprockets 82 being carried by a shaft 84 which is rotatable in bearings on a vertically movable frame 85, and the sprockets 83 being fixed on a shaft 86 which is also rotatable in bearings on the frame 85. The movable frame 85, which may be restrained in any suitable manner, as by guides 87, so that it can move only vertically, is provided with rollers 91 which rest on cams 92 carried by shafts 93 rotatable in bearings 94 on a frame 95. When the rollers 91 on the movable frame 85 are in engagement with flat sides 96 of the cams 92, as shown in Fig. 6, the lateral conveyor 80 is supported in its retracted position so that it is inoperative to convey transversely on the longitudinal conveyor 62 any pan straps on the longitudinal conveyor above the lateral conveyor. However, when the rollers 91 on the movable frame 85 are in engagement with any other portions of the cams 92, the lateral conveyor 80 is elevated into its extended position so that it is operative to transport pan straps on the longitudinal conveyor 62 above the lateral conveyor 80 transversely of the longitudinal conveyor.

Considering the manner in which the cams 92 are controlled, carried by the frame 95 is a motor 97 having a sprocket 98 which drives a chain 99, this chain being trained around a sprocket 100 fixed on a shaft 101 which is rotatable in suitable bearings carried by the frame 95. The shaft 101 has fixed thereon another sprocket 102 which drives a sprocket 103 on one of the cam shafts 93 through a chain 104. Fixed on this same cam shaft 93 is another sprocket 108 which drives a sprocket 109 on the other cam shaft 93 through a chain 110, there being a one-to-one ratio between the sprockets 108 and 109 so that the cams 92 operate in unison. Thus, as the motor 97 drives the cams 92 through one revolution, the lateral conveyor 80 is moved from its retracted position to its extended position and back to its retracted position.

The chains 81 of the lateral conveyor 80 are driven at a speed such that they transfer a rank of pan straps onto the cross-conveyor 21 during the interval that the lateral conveyor 80 is in its extended position, the lateral conveyor being driven from the motor through a chain 111 trained around sprockets 112 and 113 and a chain 114 trained around sprockets 115 and 116. The sprocket 112 is driven by the motor 97, the sprocket 115 is rigidly connected to the sprocket 113 through a shaft 117, and the sprocket 116 is fixed on the shaft 86 which carries the sprockets 83 for driving the chains 81 of the lateral conveyor 80.

Considering the operation of the lateral conveyor 80, extending across the outlet or discharge end of the longitudinal conveyor 62 is a plate 120 which stops each rank of pan straps when it is in position above the lateral conveyor. A normally open switch 121 is mounted on the plate 120 and is adapted to be closed by one of the pan straps in the rank when such pan strap is stopped by the plate. Alternatively, a plurality of switches 121 connected in parallel may be employed, such switches being spaced apart along the plate 120 transversely of the conveyor 62 in positions to be engaged by the respective pan straps in the rank so that all such switches must be engaged by pan straps to render the circuit operative. As best shown in Fig. 6 of the drawings, a normally closed switch 122 is carried by one of the guides 87 below the movable frame 85 and is engageable by the movable frame when the lateral conveyor 80 moves into its retracted position, engagement of the switch 122 by the frame 85 resulting in opening of such switch. Turning now to Fig. 8 of the drawings, the switch 121, or group of parallel-connected switches 121, and the switch 122 are connected in parallel with each other and in series with the motor 97. Thus, when a pan strap engages one of the switches 121, or when pan straps engage all of the switches 121, the motor 97 is energized to drive the lateral conveyor 80 and to drive the cams 92 for raising this conveyor into its extended position. As soon as the lateral conveyor 80 reaches its extended position, it transfers the rank of pan straps thereabove transversely of the longitudinal conveyor 62 onto the cross-conveyor 21. It will be noted that as soon as the lateral conveyor 80 transfers the rank of pan straps onto the cross-conveyor 21, the switch or switches 121 tend to open the circuit to the motor 97. However, the switch 122 closes as soon as the movable frame 85 disengages it during upward movement of the lateral conveyor 80 so that the motor 97 remains energized until such time as the lateral conveyor 80 returns to its retracted position, whereupon the movable frame 85 engages the switch 122 to open it, thus de-energizing the motor 97 until the new rank of pan straps is in position above the lateral conveyor 80.

Concerning the over-all operation of the conveyor stripping apparatus 20, as each rank of pan straps on the proofer conveyor 15 arrives at the discharge end thereof, it is stripped from the proofer conveyor by the conveying devices 54 and is transferred to the longitudinal conveyor 62 by such conveying devices. As soon as the rank of pan straps is completely on the longitudinal conveyor 62, it breaks the beam of light to the photocell 75, whereupon the latter energizes the solenoid 69 to cause the transmission 68 to drive the longitudinal conveyor 62 at its high speed, thereby spacing such rank of pan straps from the following rank of pan straps. As soon as the rank of pan straps which has been spaced from the following rank in this manner strikes the stop plate 120, it closes the switch or switches 121 to start the motor 97, the longitudinal conveyor 62 returning to its low speed as soon as this rank of pan straps moves out of the light beam to the photocell. When the motor 97 is energized in this manner, it moves the lateral conveyor upwardly into its extended position, whereupon the lateral conveyor transfers the rank of pan straps onto the cross-conveyor 21, the lateral conveyor thereafter returning to its retracted position. The motor 97, of course, completes the cycle with respect to the lateral conveyor 80 before the following rank of pan straps arrives in position to be transported laterally by the lateral conveyor 80.

Thus, as each rank of pan straps arrives at the discharge end of the proofer conveyor 15, it is stripped therefrom, spaced from the following rank of pan straps, and is transported laterally onto the cross-conveyor 21.

Although I have disclosed an exemplary embodiment of my invention herein, it will be understood that various changes, modifications and substitutions may be incorporated in such embodiment without departing from the spirit of the invention.

I claim as my invention:

1. In a conveyor stripping apparatus, the combination of: a longitudinal conveyor; a lateral conveyor for stripping articles from said longitudinal conveyor, said lateral conveyor being vertically movable between a retracted position wherein it is inoperative to strip articles from said longitudinal conveyor and an extended position wherein it is operative to do so; a motor; means operatively connected to said motor for driving said lateral conveyor to transport articles therealong; means operatively connected to said motor for imparting periodic reciprocating movement to said lateral conveyor between said retracted and extended positions, said last means including means for retaining said lateral conveyor in extended position for a delivery transit of said lateral conveyor through a distance equal at least to the width of said longitudinal conveyor; a first control means actuated by engagement therewith of an article on said longitudinal conveyor above said lateral conveyor for energizing said motor for simultaneously initiating driving operation of said lateral conveyor and movement thereof from its retracted to its extended position; and second control means actuated by engagement therewith of said lateral conveyor when in its extended position for maintaining energization of said motor to operate said lateral conveyor throughout said delivery transit upon disengagement of articles from said first control means prior to completion of said delivery transit of said lateral conveyor.

2. In a conveyor stripping apparatus, the combination of: a longitudinal conveyor comprising a plurality of transversely extending rollers; a lateral endless chain conveyor disposed between the ends of said longitudinal conveyor for stripping articles therefrom, adjacent rollers of said longitudinal conveyor being spaced apart to provide therebetween a passage adapted to receive said chain conveyor, said lateral endless chain conveyor being vertically movable between a retracted position, wherein the top run thereof is below the conveying level of said longitudinal conveyor and is inoperative to strip articles therefrom, and an extended position, wherein the top run thereof is above the conveying level of said longitudinal conveyor and is operative to strip articles therefrom; a motor; means operatively connected to said motor for driving said lateral endless chain conveyor for transporting articles thereby; means operatively connected to said motor for imparting periodic reciprocating movement to said lateral conveyor between said retracted and extended positions, said last means including means for retaining said lateral conveyor in extended position for a delivery transit of said lateral conveyor across the width of said longitudinal conveyor; a first control means actuated by engagement therewith of an article on said longitudinal conveyor above said lateral conveyor for energizing said motor to simultaneously initiate driving operation of said lateral conveyor and movement thereof from its retracted to its extended position; and second control means actuated by said lateral conveyor in its extended position for maintaining energization of said motor to operate said lateral conveyor throughout said delivery transit upon disengagement of articles from said first control means prior to completion of said delivery transit of said lateral conveyor.

3. A conveyor stripping apparatus in accordance with claim 1 wherein the means operatively connected to said motor for imparting periodic reciprocating movement to said lateral conveyor between retracted and extended positions includes a rotatable cam; and wherein the means operatively connected to said motor for driving said lateral conveyor to transport articles therealong includes transmission means for operating said lateral conveyor at a linear speed to complete a delivery transit across the width of said longitudinal conveyor during each extended period of said lateral conveyor.

References Cited in the file of this patent

UNITED STATES PATENTS

| | | |
|---|---|---|
| 771,089 | Prescott | Sept. 27, 1904 |
| 1,904,837 | Posey | Apr. 18, 1933 |
| 2,267,605 | Drake | Dec. 23, 1941 |
| 2,462,021 | Harker | Feb. 15, 1949 |
| 2,630,750 | Eberle | Mar. 10, 1953 |